US007566867B2

(12) United States Patent
Riley et al.

(10) Patent No.: US 7,566,867 B2
(45) Date of Patent: Jul. 28, 2009

(54) APPARATUS AND METHOD FOR DETECTING GAMMA RAY RADIATION

(75) Inventors: Stephen Riley, Spring, TX (US); Darryl E. Trcka, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/453,115

(22) Filed: Jun. 14, 2006

(65) Prior Publication Data

US 2007/0290127 A1 Dec. 20, 2007

(51) Int. Cl.
*G01V 5/12* (2006.01)
*G01V 5/04* (2006.01)

(52) U.S. Cl. .................................... 250/265; 250/269.7

(58) Field of Classification Search ............. 250/269.1, 250/269.6, 269.7, 265
See application file for complete search history.

(56) References Cited

U.S. PATENT DOCUMENTS 4,122,339 A * 10/1978 Smith et al. ................. 250/264
4,958,073 A * 9/1990 Becker et al. ............ 250/269.3
5,250,806 A 10/1993 Rhein-Knudsen et al.
5,550,473 A * 8/1996 Klein ......................... 324/338
6,666,285 B2 * 12/2003 Jones et al. ................... 175/50
6,995,684 B2 2/2006 Clark
2003/0213898 A1 * 11/2003 Storm et al. ............. 250/269.3
2004/0158997 A1 * 8/2004 Tang ........................... 33/304
2004/0178346 A1 9/2004 Williams et al. ....... 250/363.01
2004/0256548 A1 12/2004 Gardner ...................... 250/266
2005/0012043 A1 1/2005 Motomura et al. ..... 250/363.01
2005/0072928 A1 4/2005 Wang et al. ............ 250/363.01
2006/0015256 A1 1/2006 Hassan et al. .................. 702/6
2006/0102834 A1 * 5/2006 Mickael ................... 250/269.1
2007/0040110 A1 * 2/2007 Ellis et al. ................... 250/266

OTHER PUBLICATIONS

International Search Report for International Application No. PCT/US 07/14010. Mailed Feb. 27, 2008.
Written Opinion of the International ?Searching Authority for International Application No. PCT/US 07/14010. Mailed Feb. 27, 2008.

* cited by examiner

*Primary Examiner*—David P Porta
*Assistant Examiner*—Casey Bryant
(74) *Attorney, Agent, or Firm*—Cantor Colburn LLP

(57) ABSTRACT

An apparatus for detecting gamma ray (GR) radiation having a plurality of detector cells arranged in an array is disclosed. Each cell includes a housing having an aperture, the housing comprising a GR absorbing material, and a GR detector disposed within the housing such that external gamma rays are received at the GR detector via the aperture. The apertures of each cell are aligned.

6 Claims, 3 Drawing Sheets

175
130
T=100's µs
160
T=µs
180
170
165
T=0
155

APPARATUS AND METHOD FOR DETECTING GAMMA RAY RADIATION

BACKGROUND OF THE INVENTION

The present disclosure relates generally to an apparatus and method for detecting gamma ray radiation, more particularly to an apparatus and method for petroleum reservoir formation identification and the application of gamma ray detection for the characterization thereof, and even more particularly to an apparatus and method for determining sand shale laminations in earth formations in cased well bores.

Current petrophysical trends place large importance on determining laminated sand shale sequences from poorer quality rocks such as dispersed clay sands, as laminated zones are possible production targets for petroleum-based products, while dispersed clay sand zones are not. Conventional analysis techniques applied to these laminated sands may lead to an underestimation of net pay and productivity. In an open-hole environment, lamination detection is straight forward, but in a cased-hole environment, lamination detection is not so straight forward. Accordingly, there is a need in the art for improved lamination detection techniques suitable for use in a cased-hole environment.

BRIEF DESCRIPTION OF THE INVENTION

An embodiment of the invention includes an apparatus for detecting gamma ray (GR) radiation having a plurality of detector cells arranged in an array. Each cell includes a housing having an aperture, the housing comprising a GR absorbing material, and a GR detector disposed within the housing such that external gamma rays are received at the GR detector via the aperture. The apertures of each cell are aligned.

Another embodiment of the invention includes a method for evaluating a characteristic of a region using an apparatus having a plurality of detector cells arranged in an array, each cell having a housing with an aperture, the housing having a GR absorbing material, and a GR detector disposed within the housing such that external gamma rays are received at the GR detector via the aperture, wherein the apertures of each cell are aligned with a defined spacing for high resolution GR detection. The apparatus for detecting gamma ray (GR) radiation is disposed proximate the region, gamma rays are received at the apparatus via the plurality of apertures, and the received gamma rays are analyzed to provide high resolution measurement of the characteristic of the region.

BRIEF DESCRIPTION OF THE DRAWINGS

Referring to the exemplary drawings as illustrated and described wherein like elements are numbered alike in the accompanying Figures.

DETAILED DESCRIPTION OF THE INVENTION

An embodiment of the invention, as shown and described by the various figures and accompanying text, provides an apparatus suitable for oil well logging. The apparatus is configured for detecting gamma ray (GR) radiation by way of a plurality of enclosed detector cells arranged in an array, each detector cell having an aperture, and the plurality of apertures being aligned. In an embodiment, the apparatus enables signal detection with a sharp vertical resolution, thereby allowing the detection and discrimination of laminated shale horizons interspersed with good quality sands, from poor quality sands containing reasonable quantities of dispersed clay. In an embodiment, the apparatus is configured for operation in both an open-hole environment and a cased-hole environment.

Existing reservoir performance monitoring (RPM) devices are typically not affected by the presence of laminations, seeing instead the average of the entire sensed volume. Porosity determination with these RPM devices, however, may be perturbed by the existence of lamina, which may significantly underestimate available pore size and productivity potentials. By applying embodiments of the invention in an RPM device, it is contemplated that formation evaluation measurements will be substantially enhanced. It is also contemplated that embodiments of the invention may be employed in other wireline logging tools, such as NMR logging tools, or as a separate measuring device.

Figure 1:
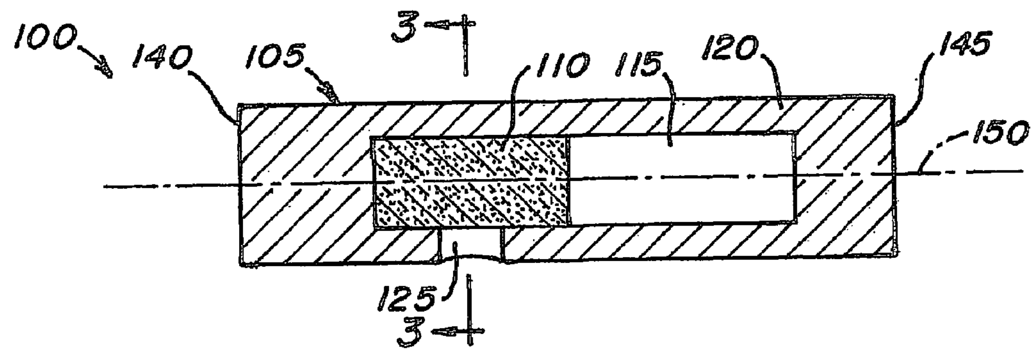
FIG. 1 depicts in block diagram form an exemplary detector cell in accordance with an embodiment of the invention.
Figure 3:
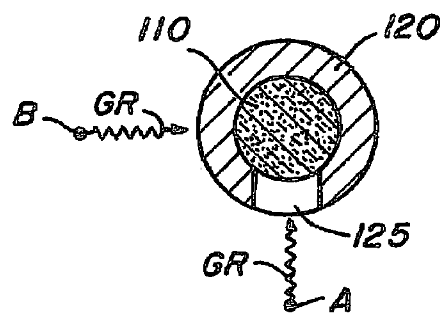
FIG. 3 depicts a cross-section view of the detector cell of FIG. 1.

Referring now to FIG. 1, an exemplary detector cell 100 in accordance with an embodiment of the invention is depicted having a conventional gamma ray (GR) detector 105, comprising a detector crystal 110 and a photo-multiplier tube (PMT) 115, enclosed and shielded by a thickness of GR absorbing material 120 (also herein referred to as a housing), such as Lead or Tungsten for example. While an embodiment of the invention has been described and illustrated employing a PMT, it will be appreciated that other light detection devices may be employed in place thereof, and that reference herein to PMT is intended to encompass any light detection device that may be employed for the purposes disclosed herein. The housing 120 includes an aperture 125 configured and disposed on a side of the housing 120 so that in application, that is, when detector cell 100 is placed in an open-hole or cased-hole bore (generally referred to as down-hole), the aperture 125 will maintain an orientation relative to the low side of the well to which it is employed, and is caused to maintain its orientation relative to the formation by some mechanical means, which may be of a type known in the art. In an embodiment, the aperture 125 may face the formation, or region of interest, on the low side of the down-hole, or alternatively in any desired direction. Within each detector cell 100, the detector crystal 110 is disposed proximate the aperture 125 for receiving external gamma rays via the aperture 125, and the PMT 115 is disposed at a distance from the aperture 125. Referring to FIG. 1, the diameter of the aperture 125 is less than the length of the detector crystal 110. Referring to FIG. 3, the diameter of the aperture is also less than the diameter of the detector crystal 110. The detector crystal 100 may be a sodium idodide (NaI) crystal, or any other material suitable for the purpose disclosed herein, such as anthracene, bismuth germanium oxide (BGO), cerium oxide (Cel), cesium iodide (Csl), gadolinium orthosilicate (GSO), lutetium orthosilicate (LSO), or any other like substance, for example. The detector crystal 110 receives radiation from the well bore, transforms the radiation into light impulses, and transmits the light impulses into the PM115 for subsequent processing.

Figure 2:
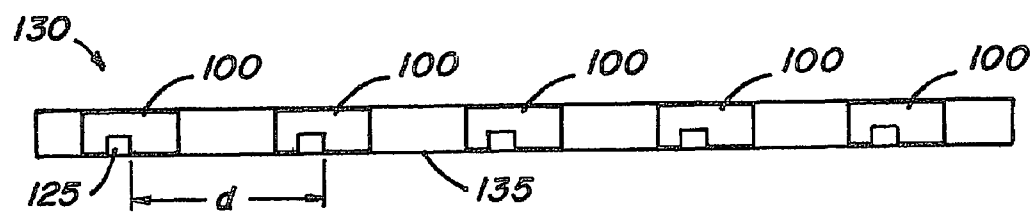
FIG. 2 depicts in block diagram form an exemplary detector apparatus in accordance with an embodiment of the invention.

In an embodiment, and with reference now to FIG. 2, an apparatus 130, suitable for detecting GR radiation, includes a plurality of detector cells 100 arranged in an array with the apertures 125 of each detector cell 100 being aligned in a straight-line fashion so that they are all oriented in the same direction. In an embodiment, the apertures 125 of each detector cell 100 are aligned with a defined spacing "d", which is sized to provide high resolution GR detection. In an embodiment, the number of detector cells 100 is determined by the desired precision, and the spacing "d" is determined by the shielding requirements. While the embodiment depicted in FIG. 2 includes five detector cells 100, it will be appreciated that this is for illustration purposes only and that the scope of the invention is intended to include any number of a plurality of detector cells 100 suitable for the purposes disclosed herein, such as 25, or 40, or any other quantity. In an embodiment, the plurality of detector cells 100 are arranged end-to-end in a repeat pattern with or without an intermediate portion 135 that may be used for containing other instrumentation or circuitry, such as a processor and storage device for processing the received gamma rays and subsequent light impulses for example. In an embodiment, the apertures 125 are sized such that the vertical resolution of each detector cell 100 is very small, and the detector cells 100 are arranged in the array of apparatus 130 such that the apparatus 130 enables GR signal detection with a very sharp vertical resolution.

Figure 4:
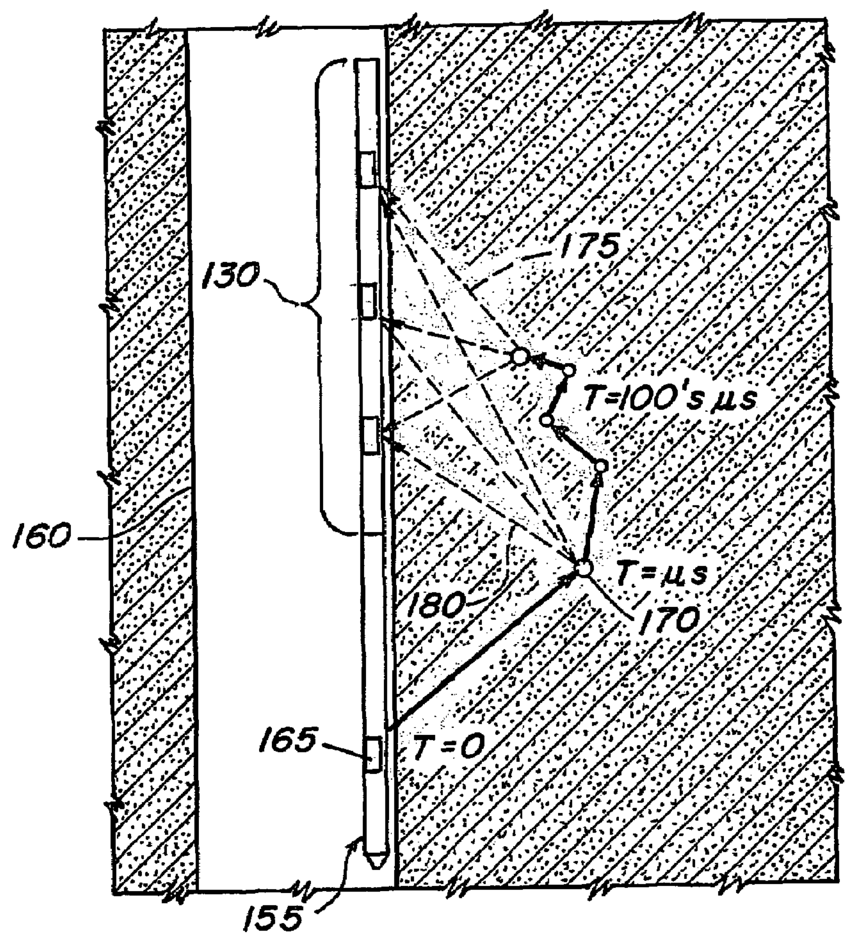
FIG. 4 depicts in block diagram form another exemplary detector apparatus in accordance with an embodiment of the invention.

Referring now to FIG. 3, which is a cross-section view through the aperture 125 of the detector cell 100 depicted in FIG. 1, it can be seen that the housing 120 is configured to provide azimuthal shielding of gamma rays while allowing absorption of gamma rays via the aperture 125. In FIG. 1, it can be seen that the ends 140, 145 of housing 120 provide vertical shielding of gamma rays (the vertical shielding being when apparatus 130 is placed vertically in a down-hole as shown in FIG. 4). As used herein, the term azimuthal shielding of gamma rays refers to the shielding of those gamma rays that originate outside of detector cell 100 from a point on a plane containing the aperture 125 and perpendicular to the axis 150 of detector cell 100, but that do not originate from a point having a line of sight with respect to the aperture 125. For example, in FIG. 3, a GR originating from point A would be seen by the detector crystal 110, while a GR originating from point B would be shielded via azimuthal shielding. While only one aperture design is illustrated in FIG. 3, it will be appreciated that various other aperture designs may be employed while still keeping within the scope and teaching of the instant invention.

Referring now to FIG. 4, a RPM device 155 is illustrated in a down-hole 160. Here, the RPM device 155 includes a GR detection apparatus 130 in accordance with an embodiment of the invention, and a radiation source 165 capable of producing a radiation region of influence, which is denoted generally by radiation lines originating from radiation source 165 and impinging an atom 170 in a region of interest, and reflected radiation lines being received back at detector cells 100 of apparatus 130. In an embodiment, the entire array or part thereof of detector cells 100, collectively referred to as the GR detection apparatus 130, is disposed within the region of influence, which is defined by the reflected and received gamma rays that originated from the radiation source 165. In an embodiment, the radiation source 165 may be a pulse neutron generator, a gamma ray generator, a radioactive material (liquid or solid) productive of gamma rays, or any combination comprising at least one of the foregoing.

In practice, the RPM device 155, with GR detection apparatus 130 and radiation source 165, will make high vertical resolution measurements of the capture 175 and inelastic 180 gamma rays generated by the neutron collisions with the well bore and formation environment, thereby enabling high vertical resolution of formation parameter measurements, such as porosity or saturation measurements, to be made.

Whether an application involves the aforementioned RPM device 155 or only the GR detection apparatus 130, each detector cell 100 of apparatus 130 is depth shifted on depth with respect to each other in a manner known in the art, and the data summed together to provide a robust statistically significant measurement.

In an embodiment, it is envisioned that apparatus 130 will be employed in a zone selection manner rather than by logging an entire interval of a down-hole. In zone selection, a selection criteria is performed on a clay volume indication curve, such as a gamma ray or a RATO (short/long space count rate ratio) curve. Here, selection would be based on picking an interval that displayed an intermediate response to clay volume, that is, neither clean nor obviously completely dirty. Such zones then could be investigated to determine if the intermediate clay volume response arises from the presence of clay lamina or dispersed clay, laminated zones being production targets, and dispersed clay zones not being production targets.

In view of the foregoing discussion of apparatus 130, an embodiment of the invention also includes a method for evaluating a characteristic of a region. In an embodiment, the characteristic of interest is the presence of sand shale laminations. In such a method, apparatus 130, as set forth above, is disposed proximate a region of interest so as to receive gamma rays from the region via the plurality of apertures. The received gamma rays are then analyzed to provide high resolution measurement data relating to the characteristic of interest within the region of interest, which enables detection of the presence of laminations within the region. In an embodiment, the high resolution measurement comprises high resolution porosity measurement.

In an embodiment employing a radiation source 165 along with a GR detection apparatus 130, the method further comprises subjecting the region to radiation capable of producing a radiation region of influence, wherein the entire array of detector cells 100 are disposed within the region of influence. Here, the received gamma rays include capture and inelastic gamma rays generated by neutron collisions arising from the region being subjected to radiation from the radiation source 165. As suggested above, the method may be implemented using a radiation source 165 such as a pulse neutron generator, a gamma ray generator, a radioactive material, or any combination comprising at least one of the foregoing.

Figure 5:
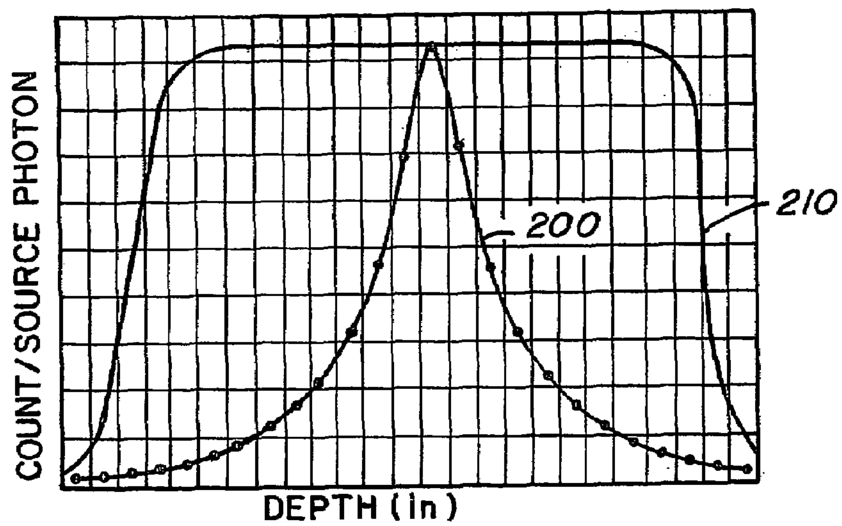
FIG. 5 depicts a response curve from an apparatus in accordance with an embodiment of the invention compared to a response curve from an apparatus not in accordance with an embodiment of the invention.
Figure 7:
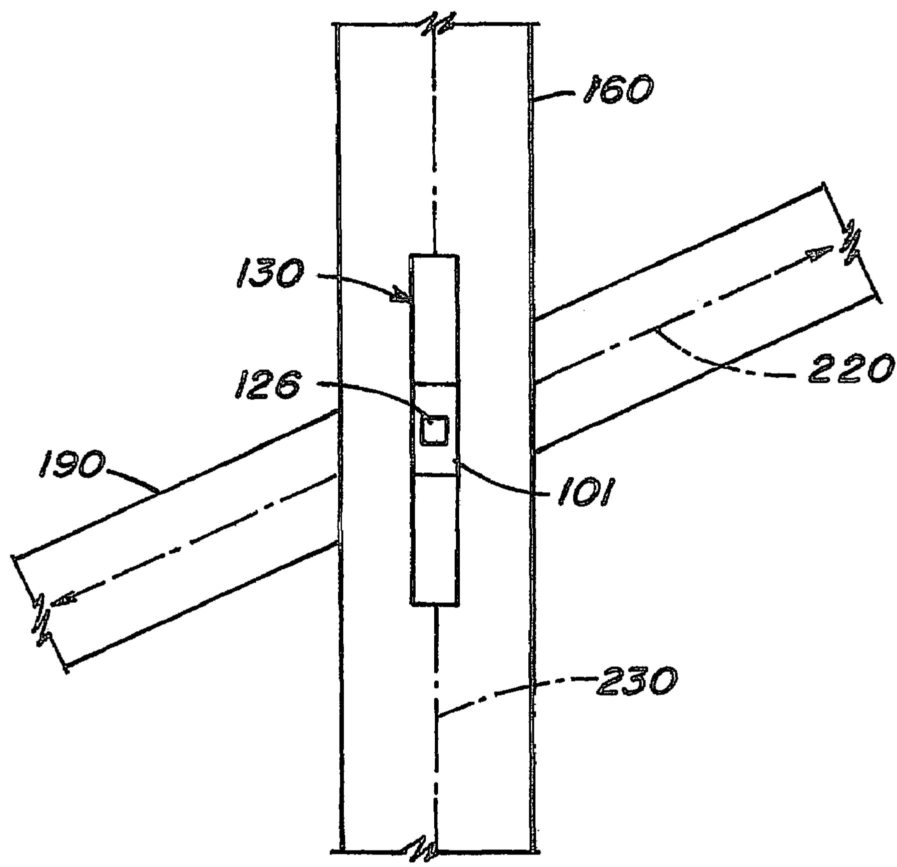
FIG. 7 depicts an alternative embodiment to that depicted in FIG. 4.

Referring now to FIG. 5, two characteristic curves are illustrated that represent a photon count rate as a function of depth of a GR measuring device in connection with measurements taken of a thin stratigraphic bed 190 (depicted in FIG. 7). Curve 200 represents a response curve provided by an embodiment of the invention, while curve 210 represents a response curve provided by a comparable tool but other than an embodiment of the invention. As can be seen, an embodiment of the invention provides a sharp discriminatory response signal as compared to the comparable tool that is not in accordance with an embodiment of the invention.

Figure 6:
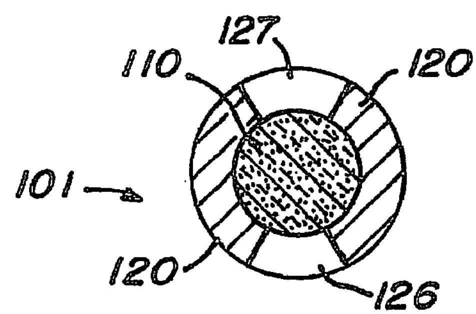
FIG. 6 depicts an alternative embodiment to that depicted in FIG. 3.

Referring now to FIGS. 6 and 7, an alternative embodiment 101 of detector cell 100 may include two apertures 126, 127, which may be oriented in the down-hole 160 so that apertures

126, 127 are perpendicular (into the page) with respect to the dip azimuth 220 (parallel to the page). By processing the double count rates received by the double apertures, the strike azimuth may be determined by rotation of the detector cell 101 relative to a vertical axis 230 of down-hole 160.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for evaluating a characteristic of a region, comprising:

disposing proximate the region an apparatus for detecting gamma ray (GR) radiation, the apparatus comprising a plurality of detector cells arranged in an array, each cell comprising a housing having two opposing apertures, the housing comprising a GR absorbing material, and a GR detector disposed within the housing such that external gamma rays are received at the GR detector via the aperture, wherein the apertures of each cell are aligned with a defined spacing for high resolution GR detection;

rotating the array of detector cells relative to a stratigraphic bed;

receiving gamma rays at the apparatus via the plurality of apertures;

receiving double count rates of gamma rays arising from each of the two opposing apertures;

analyzing the received gamma rays to provide high resolution measurement of the characteristic of the region; and analyzing the received gamma rays to determine the strike azimuth of the stratigraphic bed.

2. The method of claim 1, wherein:

the high resolution measurement comprises a high resolution formation parameter measurement.

3. The method of claim 1, wherein:

the analyzing the received gamma rays to provide high resolution measurement of the characteristic of the region enables detecting the presence of laminations within the region.

4. The method of claim 1, further comprising:

subjecting the region to radiation capable of producing a radiation region of influence, the entire array of detector cells being disposed within the region of influence;

wherein the receiving gamma rays comprises receiving inelastic gamma rays generated by neutron collisions arising from the subjecting the region to radiation.

5. The method of claim 4, wherein:

the subjecting the region to radiation comprises subjecting the region to radiation via the apparatus comprising a radiation source.

6. The method of claim 5, wherein:

the radiation source comprises a pulse neutron generator, a gamma ray generator, a radioactive material, or any combination comprising at least one of the foregoing.

* * * * *